(12) United States Patent
Susnjara

(10) Patent No.: US 8,315,731 B2
(45) Date of Patent: Nov. 20, 2012

(54) METHOD OF PRODUCING CONSTITUENT PARTS OF A PRODUCT AND PRODUCT MADE THEREFROM

(75) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 387 days.

(21) Appl. No.: 12/724,826

(22) Filed: Mar. 16, 2010

(65) Prior Publication Data

US 2011/0231003 A1 Sep. 22, 2011

(51) Int. Cl.
G06F 19/00 (2011.01)
(52) U.S. Cl. ............... 700/159; 700/95; 700/171
(58) Field of Classification Search ............ 700/95, 700/159, 171
See application file for complete search history.

(56) References Cited

U.S. PATENT DOCUMENTS

| | | | | |
|---|---|---|---|---|
| 4,555,844 A * | 12/1985 | Palfery et al. | ............... | 483/31 |
| 4,833,764 A * | 5/1989 | Muller | ............... | 29/40 |
| 5,249,896 A * | 10/1993 | Namba et al. | ............... | 409/191 |
| 5,570,292 A * | 10/1996 | Abraham et al. | ............... | 700/157 |
| 5,819,388 A * | 10/1998 | Salm | ............... | 29/424 |
| 7,171,278 B2 * | 1/2007 | Baker et al. | ............... | 700/28 |
| 2007/0265724 A1 * | 11/2007 | Mifsud et al. | ............... | 700/115 |
| 2011/0231003 A1 * | 9/2011 | Susnjara | ............... | 700/114 |

* cited by examiner

*Primary Examiner* — Ronald Hartman, Jr.
(74) *Attorney, Agent, or Firm* — Novak Druce + Quigg LLP

(57) ABSTRACT

A method of producing a set of parts from a panel of material mountable on the worktable of a CNC machine suitably programmable to perform prescribed machining functions on such panel, generally consisting of programming the machine to perform a first set of machining functions on a first side of the panel and a second set of machining functions on an inverted side of the panel, mounting the panel on the worktable, operating the machine to perform the first set of machining functions on a first side of the panel, inverting the panel on the worktable and operating the machine to perform the second set of machine functions on the second, inverted side of the panel.

18 Claims, 1 Drawing Sheet

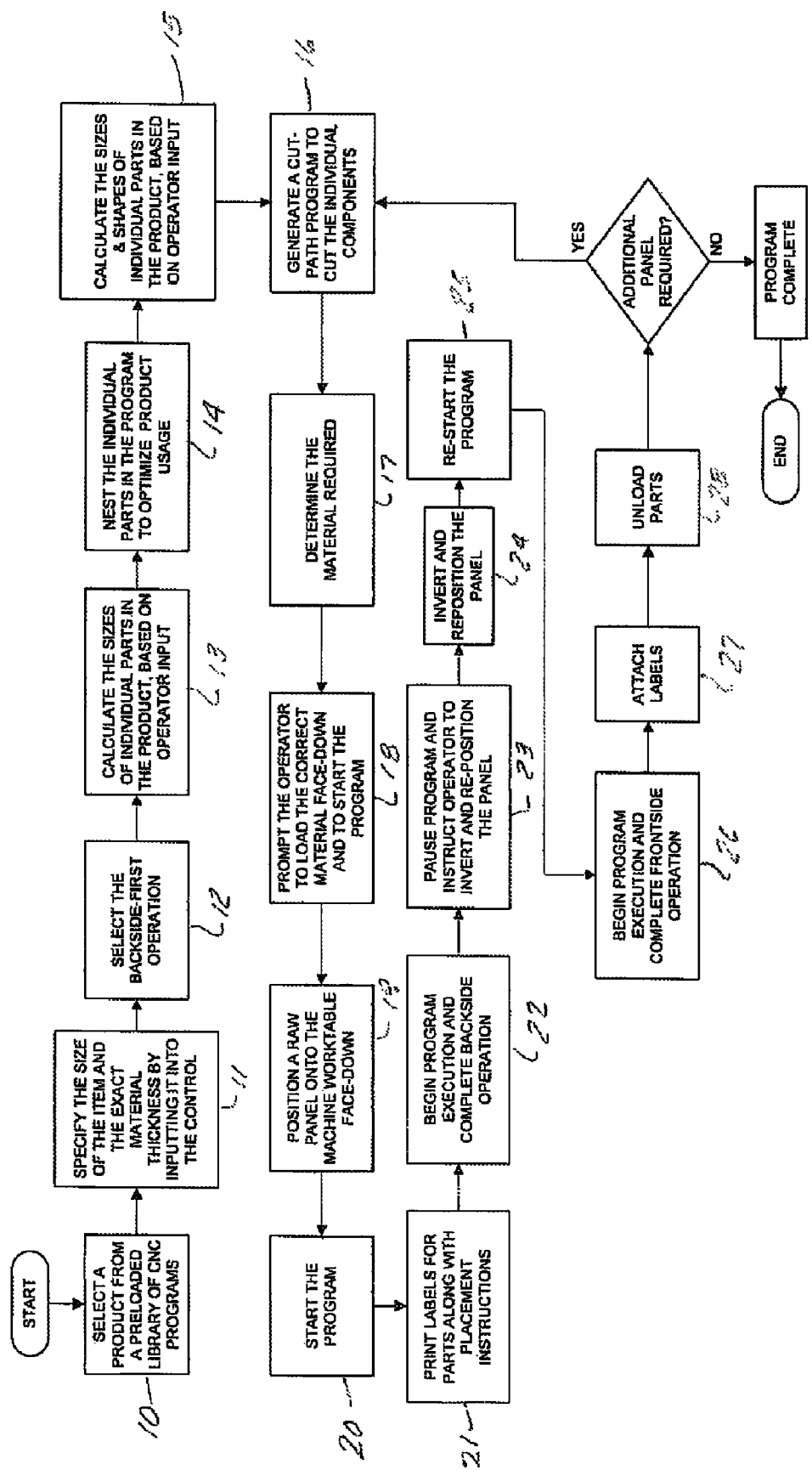

METHOD OF PRODUCING CONSTITUENT PARTS OF A PRODUCT AND PRODUCT MADE THEREFROM

This invention relates to an improved method of producing a set of parts which when formed, assembled and secured together form a product, and a product formed by such method.

BACKGROUND OF THE INVENTION

Many products such as items of furniture and the like are formed of various parts cut from panels of various materials, assembled together to form selected configurations, secured together by various means and possibly finished to complete the assembly of the products. Often, such parts are formed on programmable CNC routers from panels of materials. Typically, such parts are formed on such machines by selecting a panel of material of suitable dimensions, loading and detachably securing such panels on the worktables of such machines and then operating the machines to guide one or more cutting tools in forming the parts. Such operations normally consist of forming various indentations such as slots and the like in the faces and edges of the parts, drilling openings through the parts and severing the panels to provide parts of various profiles.

In following the aforementioned procedure, it has been the practice in the prior art to load a panel on the worktable of the machine, operate the machine to form the required indentations in the exposed, upper side of the panel and then sever the panel to provide the desired profiles of the parts. The unused portion of the panel is then removed from the worktable, the cut parts remaining on the table requiring machining on the underside thereof are inverted and suitably positioned on the worktable, and the machine being suitably programmed is operated to provide the required machining on the inverted sides of the parts.

Although such practice has been found to be suitable in producing parts of required configurations, it further has been found to require excess material handling and be unduly time consuming, thereby adversely affecting productivity. It therefore is the principal object of the present invention to provide an improved method of producing a set of parts from a panel of material comparable to the method as described, in which material handling is minimized, execution time is reduced, and productivity correspondingly is materially improved.

SUMMARY OF THE INVENTION

The principal object of the present invention is achieved by providing a method of producing a set of parts from a panel of material mountable on the worktable of a CNC machine programmable to perform prescribed machining functions on the panel, generally consisting of programming the machine to perform a first set of machining functions on a first side of the panel and a second set of machining functions on an inverted side of the panel, mounting the panel on the worktable of the machine, operating the machine to perform the first set of machining functions on a first side of the panel, inverting the panel on the worktable, and finally operating the machine to perform the second set of machining functions. Preferably, the programming of the machine includes a provision for nesting the parts on the panel for yielding a maximum utilization of the panel in providing the parts. The procedure as described may be repeated utilizing a number of panels, and the program of the machine may provide for forming different sets of parts for different products.

BRIEF DESCRIPTION OF THE DRAWING

FIG. 1 is a flow diagram depicting a sequence of the steps involved in the method embodying present invention.

DETAILED DESCRIPTION OF THE PREFERRED EMBODIMENTS OF THE INVENTION

Referring to the single FIGURE of the drawing, there is illustrated a series of sequential steps to be taken in practicing an embodiment of the present invention. Generally, the method involves the use of a suitably programmed CNC router by an operator having access to panels of material of suitable dimensions. Initially, the operator would operate the machine to select a product from a preloaded library of programs for producing various products, for which one or more sets of parts are to be formed, specify the size of the product and the thickness of the material from which the parts are to be formed and designate the backside of the panel from which the parts are to be formed, to be operated first, as shown in steps 10 through 12. The machine then would calculate the sizes of the individual parts of the set of parts to be formed, based on the input of the operator, nest the individual parts in the program to optimize the usage of the panel from which the parts are to be formed, and calculate the sizes and shapes of the individual parts of the set, as indicated in steps 13 through 15. The machine then generates a cut-path program corresponding to the set of parts to be formed, determines the material required to form such set of parts and then prompts the operator to load the correct material onto the worktable of the machine and start the program, as shown in steps 16 through 18. In steps 19 and 20, responsive to a prompting by the machine, the operator obtains the material designated by the machine, consisting of a panel of material of prescribed length, width and thickness, loads such panel on the worktable of the machine, operating certain controls to detachably secure the panel to the worktable, and then starts the machine. If the parts to be produced from the panel of material loaded on the worktable of the machine may require certain routing or subsequent operations, such information is generated by the machine on set of labels containing such instructions, with further indications in terms of the particular parts to which such labels apply, as shown in step 21.

Once the various labels have been printed, the machine is operated to commence machining the loaded panel to produce the set of parts, as indicated in step 22. In doing so, the machine might utilize one or more tools to machine the exposed surface of the loaded panel to form various indentations such as slots and the like, and drill any openings therethrough. Once the machining operations on the upper side of the panel have been completed, as indicated in step 23, the machine operation would pause, instructing the operator to invert the panel, reposition it on the worktable of the machine. The operator then would invert the panel and reposition it on the worktable and restart the machine, in steps 24 and 25. Once the machine has been restarted, the machine would function to machine the upper, inverted side of the loaded panel including severing the panel to produce a set of parts of desired profiles, as indicated in step 26. After such machining operations have been completed, the operator would attach the printed labels to the parts having been produced, the unused portion of the panel from which parts were formed would be removed from the worktable and possibly scraped and the remaining formed parts on the worktable of the machine would be unloaded and transmitted to an assembly area, as indicated in steps 27 and 28. In the event that an additional panel was required to provide the required parts, steps 16 through 28 would be repeated. If not, the operation would be completed.

In the process as described, it is contemplated that the machining functions on the first side of the panel would essentially be nonsevering machining functions and the machining functions on the inverted side of the panel would consists of severing and possibly of nonsevering functions. Such procedure permits the nonsevering functions to be performed on the first side of the panel and, following the nonsevering functions on the first side thereof, the intact panel to be lifted and inverted as a single entity and repositioned on the worktable of the machine for performing the severing and possibly nonsevering machining functions on the inverted side of the panel. Once the machine operations on the first and inverted sides of the panel have been completed, the operator may simply lift and dispose of the unused portion of the panel, and assemble and transport the set of machined components to an assembly area. Such a procedure eliminates the need of performing severing and nonsevering machining functions on a loaded panel, removing the unused portion of the panel, selecting and removing those parts on the worktable not requiring machining operations on the undersides thereof and further selecting, inverting and positioning those parts on the worktable requiring machining operations on the undersides thereof, thereby simplifying the machining process, requiring less time and effort on the part of the operator and correspondingly improving productivity.

In circumstances where a panel is loaded onto the worktable of a machine and certain parts to be produced from such panel may not require nonsevering machining on the undersides thereof, the machine may be programmed to provide both nonsevering and severing functions with respect to those parts, before the completion of the first phase of operation of the panel and before the panel is inverted to provide the severing and possibly nonsevering machining functions on the reverse side. Under such circumstances, it is contemplated that when the first phase of the machining operation has been completed, the completed, severed parts would be removed, the panel less the removed parts would be inverted and positioned on the worktable of the machine, and the machine would be reactivated to perform the severing and possibly nonsevering machining functions on the inverted side of the panel. With all of the parts thus having been formed, the unused portion of the panel would be removed and discarded and the remaining formed parts would be removed and transported to an assembly area. Labels designating further handling of such parts would be applied to the produced parts in the manner as previously described.

Once formed, with labels attached, the parts are transported to an assembly area to be assembled, secured together and possibly finished to provide a composite product. The labels generated by the machine may consist of a strip on which the labels are adhesively attached. Each label would include various forms of indicia designating the part to which the label is to be applied, the prescribed nature of the material of the part, the end product to which the part relates, indications of any further work required on the part such as edging and the like, possibly the designation of an adjoining part and the manner of joining a pair of parts together. It further is contemplated that the machine further would generate a plan depicting the layout of the parts on the panel that would enable the machine operator to remove labels from the strip generated by the machine, refer to the plan generated by the machine to determine to which part a particular label should be applied and apply such label to the designated part.

From the foregoing detailed description, it will be evident that there are a number of changes, adaptations and modifications of the present invention, which come within the province of those persons having ordinary skill in the art to which the aforementioned invention pertains. However, it is intended that all such variations not departing from the spirit of the invention be considered as within the scope thereof as limited solely by the appended claims.

I claim:

1. A method of producing a set of parts from a panel of material mountable on the worktable of a CNC machine suitably programmable to perfolin prescribed machining functions on said panel, comprising:
   programming said machine to perform a first set of machining functions on a first side of said panel and a second set of machining: functions on an inverted side of said panel;
   mounting said panel on said worktable;
   operating said machine to perform said first set of machining functions on a first side of said panel;
   inverting said panel on said worktable; and
   operating said machine to perform said second set of machine functions on said second, inverted side,
   wherein said first set of machine functions comprise nonsevering functions and said second set of machining functions comprise severing functions.

2. A method according to claim 1 wherein said first set of machine functions includes forming at least one of indentations and through openings.

3. A method according to claim 1 wherein said second set of machine functions includes forming at least one of indentations and through openings.

4. A method according to claim 1 wherein said first set of machine functions includes severing a part not requiring a machining function on the inverted side thereof.

5. A method according to claim 1 wherein said programming provides for nesting said parts on said panel for yielding a maximum utilization of said panel in providing said parts.

6. A method according to claim 5 wherein said first set of machine functions comprises nonsevering functions and said second set of machining functions comprise severing functions.

7. A method according to claim 5 wherein said first set of machining functions includes forming at least one of an indentation and a through opening.

8. A method according to claim 5 wherein said second set of machining functions includes forming at least one of an indentation and a through opening.

9. A method according to claim 5 wherein said first set of machining functions includes severing parts not requiring a machining function on the opposite side thereof.

10. A method according to claim 9 including removing severed parts from said worktable prior to inverting said panel to perform said second set of machining functions.

11. A method according to claim 5 wherein said programming designates the dimensions of said panel.

12. A method according to claim 1 wherein said machining functions includes at least one of routing, sawing and drilling.

13. A product formed by a method comprising:
    programming a CNC machine to perform a first set of machining functions on a first side of a panel mounted on a worktable of said machine and a second set of machining functions on an inverted side of said panel to produce a set of parts which may be joined together to provide said product;

mounting said panel on said worktable;
operating said machine to perform said first set of machining functions on a first side of said panel;
inverting said panel on said worktable;
operating said machine to perform said second set of machining functions;
assembling parts formed by said machining functions pursuant to a predetermined configuration; and
securing said assembled parts together,
wherein said first set of machining functions comprise nonsevering functions and said second set of machining functions comprise severing functions.

14. A product according to claim 13 wherein said first set of machining functions includes forming at least one of an indentation and a through opening.

15. A product according to claim 13 wherein said second set of machining functions includes forming at least one of an indentation and a through opening.

16. A product according to claim 13 wherein said first set of machining functions includes severing a part not requiring a machining function on the inverted side thereof.

17. A product according to claim 13 wherein said programming provides for nesting said parts on said panel for yielding a maximum utilization of said panel in providing said parts.

18. A product according to claim 13 wherein said parts arc configured to be assembled and secured together to form a selected item of furniture.

* * * * *

UNITED STATES PATENT AND TRADEMARK OFFICE
CERTIFICATE OF CORRECTION

Page 1 of 1

PATENT NO. : 8,315,731 B2
APPLICATION NO. : 12/724826
DATED : November 20, 2012
INVENTOR(S) : Susnjara It is certified that error appears in the above-identified patent and that said Letters Patent is hereby corrected as shown below:

Claim 1: Column 4, line 14 should read: "...programmable to ~~perfolin~~ <u>perform</u> prescribed machining..."

Claim 1: Column 4, line 18: "...set of machining~~:~~ functions on..." Please consider the ":" deleted.

Signed and Sealed this
Twenty-sixth Day of February, 2013

Teresa Stanek Rea
*Acting Director of the United States Patent and Trademark Office*